United States Patent
Oppenheimer et al.

(10) Patent No.: US 11,074,259 B2
(45) Date of Patent: Jul. 27, 2021

(54) OPTIMIZE QUERY BASED ON UNIQUE ATTRIBUTE

(71) Applicant: ENTIT Software LLC, Sunnyvale, CA (US)

(72) Inventors: Kahlil Bre Oppenheimer, Cambridge, MA (US); Jaimin M. Dave, Cambridge, MA (US)

(73) Assignee: Micro Focus LLC, Santa Clara, CA (US)

(*) Notice: Subject to any disclaimer, the term of this patent is extended or adjusted under 35 U.S.C. 154(b) by 769 days.

(21) Appl. No.: 15/557,890

(22) PCT Filed: Mar. 27, 2015

(86) PCT No.: PCT/US2015/023044
§ 371 (c)(1),
(2) Date: Sep. 13, 2017

(87) PCT Pub. No.: WO2016/159936
PCT Pub. Date: Oct. 6, 2016

(65) Prior Publication Data
US 2018/0075102 A1    Mar. 15, 2018

(51) Int. Cl.
*G06F 16/2453* (2019.01)
(52) U.S. Cl.
CPC .... *G06F 16/24549* (2019.01); *G06F 16/2453* (2019.01); *G06F 16/24544* (2019.01)
(58) Field of Classification Search
None
See application file for complete search history.

(56) References Cited

U.S. PATENT DOCUMENTS

| | | | |
|---|---|---|---|
| 5,367,675 A * | 11/1994 | Cheng | G06F 16/24544 |
| 6,516,310 B2 | 2/2003 | Paulley | |
| 8,306,959 B2 | 11/2012 | Nica | |
| 8,396,860 B1 | 3/2013 | Ramesh et al. | |
| 8,682,932 B2 | 3/2014 | Raghavan et al. | |
| 2003/0088579 A1 | 5/2003 | Brown et al. | |
| 2006/0136382 A1 | 6/2006 | Dettinger et al. | |
| 2008/0027907 A1 | 1/2008 | Brown et al. | |
| 2008/0177697 A1 | 7/2008 | Barsness et al. | |

(Continued)

OTHER PUBLICATIONS

Haas et al., "Extensible Query Processing in Starburst", ACM, 1989 (Year: 1989).*

(Continued)

*Primary Examiner* — Amresh Singh

(57) ABSTRACT

Example implementations relate to optimized queries based on unique attributes. For example, a computing device may include a processor. The processor may receive a query and identify at least one unique attribute based on at least one operation specified in the query or based on an attribute property associated with at least one relational table relevant to the query, the attribute property indicating uniqueness. The processor may modify a data structure representing the query, the data structure having nodes each associated with a respective relational table and the data structure modified to specify a subset of the nodes that are associated with the at least one unique attribute. The processor may optimize the query based on the data structure modified to specify the subset.

18 Claims, 2 Drawing Sheets

(56) References Cited

U.S. PATENT DOCUMENTS

| | | |
|---|---|---|
| 2010/0114869 A1 | 5/2010 | Deolalikar et al. |
| 2013/0091119 A1* | 4/2013 | Huang .............. G06F 16/24535 |
| | | 707/713 |
| 2015/0019583 A1* | 1/2015 | Mittelstadt ........ G06F 16/24537 |
| | | 707/765 |

OTHER PUBLICATIONS

Arivd Heise et al., Scalable Discovery of Unique Column Combinations, < http://www.vldb.org/pvldb/vol7/p301-heise.pdf >, 301-312, Sep. 5, 2014.

International Searching Authority., International Search Report and Written Opinion dated Dec. 16, 2015 for PCT Application No. PCT/US2015/023044 Filed Mar. 27, 2015, 9 pgs.

* cited by examiner

OPTIMIZE QUERY BASED ON UNIQUE ATTRIBUTE

BACKGROUND

Many entities (e.g., enterprises, organizations, computer applications, etc.) utilize databases for storage of data relating to the entities. The data in a database may be accessed and analyzed for various purposes. For example, a query may be submitted requesting a particular set of data from the database, and that data may be provided in response to the query.

BRIEF DESCRIPTION OF THE DRAWINGS

Some examples of the present application are described with respect to the following figures.

DETAILED DESCRIPTION

Figure 1:
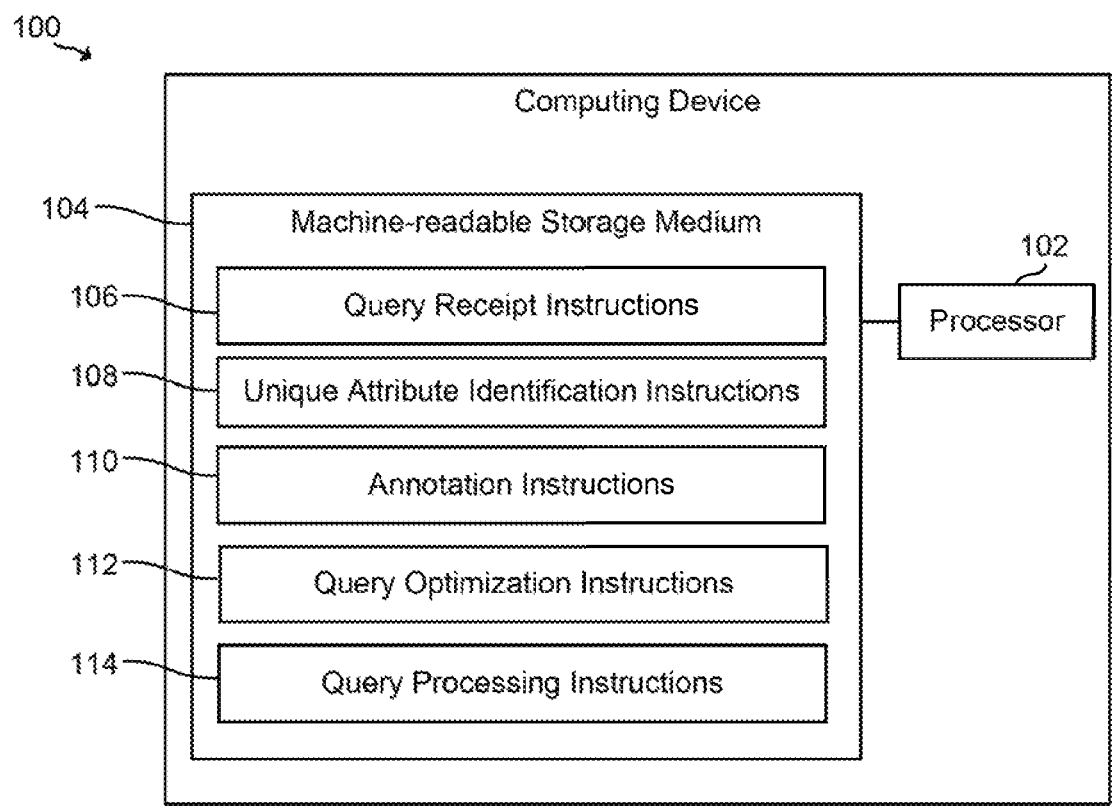
FIG. 1 is a block diagram of an example computing device for optimizing a query based on unique attributes.

As described above, data stored in a database may be accessed and analyzed for various purposes. For example, a user may submit a query requesting a particular set of data from a database, and a computing system associated with the database may process the query to provide the requested set of data. The amount of processing time for a particular query may depend upon the nature of the query and the amount of data relevant to the query. For example, complicated queries requesting data from a database storing a large amount of data may take hours or even days to process.

To run queries more efficiently, queries may be optimized based on unique attributes associated with data relevant to a query. For example, a query may be received by a computing device associated with one or more databases. The databases may be any suitable database, such as a database storing relational tables. The computing device may identify at least one unique attribute based on at least one operation specified in the query or based on an attribute property associated with at least one relational table relevant to the query. The attribute property may be any suitable attribute property indicating uniqueness. A data structure representing the received query may be, accessed and modified to specify any of the unique attributes identified. The data structure may be any suitable data structure representing the query, such as a graph data, structure, a tree data structure, the query string of the query, and the like. The data structure may have nodes each associated with either a sub query associated with the query or a respective relational table relevant to the query, and the data structure may be modified to specify any nodes that are associated with the at least one unique attribute. The query may be optimized in any suitable manner based on the modified data structured, and the optimized query may be processed to produce and provide results in response to the original query received.

The unique attributes associated with the query may be identified in any suitable manner. In some examples, unique attributes may be identified based on attribute properties indicating uniqueness. For example, a relational table relevant to the query may specify query-related and/or user-supplied data definition constraints that indicate uniqueness of an attribute, such as primary key constraints, unique constraints, identity column definitions, and the like. In some examples, unique attributes may be identified based on operations specified in the query, where those operations may indicate uniqueness of an attribute. Once the unique attributes are identified, it may be determined whether the uniqueness of the identified attribute is preserved for operations relating to the query. This may be performed by accessing the data structure associated with the query (e.g., a join graph associated with the query) and annotating the data structure to specify nodes corresponding to relational tables that have unique attributes and/or sub-queries having unique attributes. If a node corresponds to a sub-query, the data structure associated with the sub-query may be accessed, and the nodes in that data structure may be annotated to specify unique attributes. This may be performed for any number of nested queries. The annotations associated with unique attributes may be propagated to higher level nodes if the annotations apply to the root node until the top-level data structure is annotated accordingly. The top-level data structure may be used to generate an optimized query. In some examples, certain query operations may maintain the uniqueness of unique attributes when those operations are performed on the unique attributes, and a query may be optimized based on the properties of those operations. For example, if a node corresponding to a sub-query has an operation that preserves the uniqueness of a unique attribute, that uniqueness may be propagated to the root node associated with the sub-query node, and the received query may be optimized accordingly.

A query may be optimized based on various operations associated with the query. For example, an order-by operation in a query may indicate that the data requested by the query be returned in an order that is based on a specified attribute. For example, for some relation T (a, b, . . . , c), where b is a guaranteed unique attribute, a query that orders by attributes of T that include b may not have to be sorted by any attributes to the right of b. If T is stored and sorted on b, the order-by operation that sorts b may be ignored. For example, assume the following relation t, where "ID" is an identity column:

| Name | ID | Salary |
|---|---|---|
| Jaimin | 1 | 200 |
| Kahlil | 2 | 300 |
| Nga | 3 | 100 |
| Michael | 4 | 220 |

A query that states "SELECT*FROM t ORDER BY name, salary, id" may have results obtain by performing some sorting, where the results are as follows:

| Name | ID | Salary |
|---|---|---|
| Jaimin | 1 | 200 |
| Kahlil | 2 | 300 |
| Michael | 4 | 220 |
| Nga | 3 | 100 |

A query that states "SELECT*FROM t ORDER BY salary, name, id" may have results obtained by performing some sorting as well, where the results are as follows:

| Name | ID | Salary |
|---|---|---|
| Nga | 3 | 100 |
| Jaimin | 1 | 200 |
| Michael | 4 | 220 |
| Kahlil | 2 | 300 |

However, if a query with a unique attribute appears to the left of any other attribute in the order-by clause, no sorting may be needed upon execution of the query for any attributes to the right of the unique attribute. If the relation is sorted on the unique attribute, no sorting may be needed at all. For example, the queries "SELECT*FROM t ORDER BY id, name, salary" and "SELECT*FROM t ORDER BY id, salary, name" have the identity column (e.g., id) to the left of the salary and name attributes and thus may result in the following, which is unchanged from the stored data:

| Name | ID | Salary |
|---|---|---|
| Jaimin | 1 | 200 |
| Kahlil | 2 | 300 |
| Nga | 3 | 100 |
| Michael | 4 | 220 |

If the results are to be sorted based on the unique attribute (e.g., the ID column), no further sorting alters the results at all. Sorting is not needed beyond the unique attribute because sorting does not change the order of the data after the unique column, since sorting beyond a column would only occur if that column contained duplicates. By definition, a column for a unique attribute does not contain duplicates, and each entry in the column is unique. As such, a query may be optimized by modifying the query plan to avoid sorting beyond a unique attribute.

For group-by operations in a query, results of the query may be grouped by a specified attribute. However, because unique attributes, imply that there are no duplicate entries, grouping of any set of attributes that contains one or more unique attributes would result in unchanged data. For example, assuming some relation T (a, b, . . . , c), where b is a guaranteed unique attribute, a query that groups by attributes of T, including b, need not do any grouping at all. By definition, a group-by operation eliminates duplicate values of the group-by attribute, but if one of the grouping attributes is guaranteed to be unique, no duplicate values are present and no grouping needs to be performed. For example, assume the following relation t:

| Name | ID | Salary |
|---|---|---|
| Michael | 1 | 100 |
| Jaimin | 2 | 200 |
| Kahlil | 3 | 300 |
| Nga | 4 | 100 |
| Michael | 5 | 100 |

If a query includes a group-by clause with one or more unique attributes, no grouping may need to be performed. For example, the queries "SELECT*FROM t GROUP BY Id, name, salary" and "SELECT*FROM t GROUP BY id, salary, name" have the identify column as a subset of the grouping attributes, and thus may result in the following:

| Name | ID | Salary |
|---|---|---|
| Jaimin | 2 | 200 |
| Kahlil | 3 | 300 |
| Michael | 1 | 100 |
| Michael | 5 | 100 |
| Nga | 4 | 100 |

Because grouping of a unique attribute results in an unchanged order of data, the group-by operation may be considered unique since the subset of attributes present in the group-by operation is unique. Since there are no duplicate values, the values are not grouped. As such, a query plan for a query having a group-by operation with unique attributes may be modified to accommodate for this uniqueness.

When left and/or right outer joins are performed, where the columns of the non-preserving side are guaranteed to be unique, certain optimizations may be made. The following examples will focus on a left outer join (LOJ), but one of ordinary skill in the art will recognize that the inverse is also true of right outer joins (ROJs).

Take two relations A and B, which share an attribute x. If B.x is an identity column, and nothing is known about A.x, certain characteristics may be determined about a LOJ between A and B:

(1) Because of the nature of LOJ, at the very least, each row from A will be preserved, meaning: |A LOJ B on x|>=|A|;

(2) Because B.x is guaranteed to be unique, at most, each tuple of A will match up with one with one tuple from B, meaning: |A LOJ B on x|<=|A|;

(3) Because both (1) and (2) are true, the following can be concluded: |A LOJ B on x|==|A|;

(4) Because each row of A will be preserved in the LOJ, and no additional rows will be created, the entire A relation remains, with additional columns from B, but otherwise remains identical; and (5) If only attributes of A are referenced after the LOJ, performing the join was unnecessary in the first place.

For example, take two relations, A and B, with the following schemata:

A (c_make varchar, c_model varchar, owner int)

B (emp_id identity, name varchar)

A

| C_make | C_model | id |
|---|---|---|
| Honda | Civic | 3 |
| Honda | Accord | 4 |
| Mazda | Miata | 3 |
| Toyota | Corrola | 2 |
| Subaru | Forester | 6 |

B

| id | name |
|---|---|
| 1 | Nga |
| 2 | Jaimin |
| 3 | Kahlil |
| 4 | Michael |

Certain operations may perform a join even if they include unique attributes. For example, SELECT A.c_make, A.c_model, A.id FROM A NATURAL JOIN B may cause any results from A that are not also in B to be lost. From the example above, this operation would lose the row containing [Subaru, Forester, 6], leaving a result of:

| C_make | C_model | id |
|---|---|---|
| Honda | Accord | 4 |
| Honda | Civic | 3 |
| Mazda | Miata | 3 |
| Toyota | Corrola | 2 |

In another example, SELECT A.c_make, A.c_model, A.id FROM A RIGHT OUTER JOIN B ON (A.id=B.id) may preserve rows from B that may not have been originally in A. From the example above, the row containing [1, Nga] from B may result in an extra row in A, leaving a result of:

| C_make | C_model | id |
|---|---|---|
| Honda | Accord | 4 |
| Honda | Civic | 3 |
| Mazda | Miata | 3 |
| Toyota | Corrola | 2 |
| Null | Null | Null |

Both of the above join operations may require performing the join to ensure correct results, even though only rows from A after the join are selected. However, performing A LEFT OUTER JOIN B ON (A.id=B.id) may not require a join to be performed. For example, SELECT A.c_make, A.c_model, A.id FROM A LEFT OUTER JOIN B ON (A.id=B.id) may guarantee that |A LOJ B on x|==|A|, leaving a result of:

| C_make | C_model | id |
|---|---|---|
| Honda | Civic | 3 |
| Honda | Accord | 4 |
| Mazda | Miata | 3 |
| Toyota | Corrola | 2 |
| Subaru | Forester | 6 |

This result is the same as the original A relation, without the ordering, which is irrelevant. As such, there is no need to perform left outer join operations when the non-preserving side of the join is guaranteed to be unique, and the attributes of the other relation are not needed. To determine whether the attributes of the other relation are needed, the query plan may be searched for those attributes that show up in a select operation, a group-by operation, an order-by operation, and/or a where operation. If it is determined that the results of a join operation are needed, and those results cannot be discarded, then any subsequent joins that rely on those results may also be needed, even if they do not show up in a select, group-by, or order-by operation.

In some examples, the where operation may be checked for an attribute of the non-preserving side, although this occurrence may be rare. If there were any constraints on the non-preserving side in the where clause, the join would have been converted to an inner join, unless that predicate preserves null values (e.g., is null). All other predicates do not preserve null results, and thus would be converted into inner queries beforehand.

Inner-join or semi-join operations with Foreign Key and/or Primary Key relationships provide the same one-to-one cardinality join guarantee that LOJs with guaranteed unique attributes provide. This means that if two relations are joined on a foreign key to a primary key and don't reference the primary key side, the join does not need to be performed at all. For example, consider the following tables:
Employee(empid, empname, deptid)
Dept(deptid, deptname)

For the query "select e.empid, e.empname from employee e, dept d where e.deptid=d.deptid," assume there is a PK-FK relationship between deptid column of dept table and deptid column of employee table. Because of this constraint, each value of deptid in employee table is guaranteed to be present in the deptid column of dept table, so no rows will get filtered out. It can also be guaranteed that no duplicates will be generated because the deptid is a primary key in the dept table. Since columns from the dept table are not being fetched, the join is not required.

Cross join operations with guaranteed unique sets of attributes on the resultant attributes may also be prunable. If the cross join of two relations are taken without referring to the attributes of one of those two relations, and a guarantee of uniqueness on a subset of the result attributes of the cross join exists, then that cross join, does not need to be performed at all. For example, the query "select distinct A.id from A, B" may be rewritten as "select distinct A.id from A." This is identified as a cross join because a cross join, in terms of the attributes of A, will only create duplicates, so removing those duplicates is the same as if those duplicates were removed from A in the first place. This optimization may also apply to left and/or right outer join where the non-preserved side is not referenced, and there is a guarantee of uniqueness on the result attributes of the join. This may differ than the earlier left and/or right outer join optimization mentioned, in which the non-preserved side of the join had to have a guarantee of uniqueness on a subset of the join attributes. This optimization has no restrictions on either side of the join, only a restriction on the result set of attributes of the join.

There are several properties and operations that guarantee unique results, and the manner in which the unique results may be achieved may be categorized as either base cases or inductive cases. A base case requires only local knowledge (e.g., no recursive calls or checks) to determine the uniqueness of a given set. An inductive case requires a recursive and/or inductive check to determine the uniqueness of a given set. Attribute properties that generally guarantee uniqueness include primary key constraints, unique constraints, identity column definitions, and the like. These properties are categorized as base cases in determining the uniqueness of a given set, because they are determined without any further recursive inquiry of the query.

Various operations may also guarantee uniqueness of the attributes they are applied to, such as select distinct operations, set operations (e.g., union, intersect, difference, etc.), group-by operations, 1:1 (e.g. non null-preserving) join operations, 1:m (e.g., non null-preserving) semi-join operations, and the like. These operations may guarantee uniqueness of the attributes they are applied to (e.g., group-by a, b, c does not guarantee uniqueness of a, b, c nor b, c, or d individually, but only on the set {a, b, c}).

Operations such as select distinct operations, set operations, and group-by operations may be considered base cases, as uniqueness of these cases may be determined locally. Base cases may have attribute properties that guarantee uniqueness (e.g., identity column definitions, primary key definitions, unique key column definitions, etc.). Operations such as 1:1 join operations and 1:m semi-join operations may be considered inductive cases, as these cases may require knowledge of uniqueness of their operands. Once uniqueness for a given case is determined, the data structure associated with a given query may be annotated to specify the guaranteed uniqueness of any attributes from any given nodes, including nodes for relations and sub-queries.

If it is determined that a sub-query's result is unique via one of the aforementioned properties or operations, then the sub-query may be a possible candidate for removal, assuming all other conditions of the optimization are met. However, if a sub-query is not an immediate candidate for removal, some optimizations may still be performed. The optimization may be recursively applied to the sub-query, pruning out its unnecessary joins, if any, to reduce the work load recursively. If the sub-query can be pruned down to be all but one node (e.g., if all joins are removed), then that node can be moved up to replace the sub-query node and flatten the structure to see if that node is applicable for the optimization. In other words, even if it is not initially obvious that a sub-query result can be immediately pruned, it may still be possible to do so.

Assuming a relation A and an arbitrarily complex sub-query SQ, if SQ is annotated as being unique on a subset of join keys S, one sample optimization that may apply is that "SELECT A._foo_FROM A LOJ SQ ON S WHERE . . . " may be transformed into "SELECT A.foo from A WHERE."

A query may be optimized in various manners based on uniqueness. In some examples, the query is represented as a graph data structure called a Join Graph. Each node of the Join Graph is either a table or a sub-query. Each sub-query node is, itself, another Join Graph. The edges of the graph represent joins.

Uniqueness may be annotated within the Join Graph. The entire graph may be traversed, and each node may be marked with the attributes that the node is guaranteed to be unique on. While doing this, each sub-query may be recursively checked as well, resulting in all nodes of the query being checked.

If a node that is being annotated is a table, its uniqueness is annotated based on the table's data definition language (DDL) constraints (e.g., identity columns, primary key columns, etc.).

If the node is a sub-query, DDL constraints that are obtained from various operations may be checked. These operations may include group-by operations, select distinct operations, set operations (e.g., union, except, intersect, etc.), the preservation of already determined uniqueness through joins, and the like.

If a select distinct operation is performed for a set of attributes, then the sub-query is guaranteed to be unique on that set of attributes, though not necessarily on each individual attribute. The same may apply for group-by operations and set operations.

To see how uniqueness is determined through joins, each node is analyzed (e.g., assuming they've already been analyzed to check for basic uniqueness like DDL constraints, select distinct operations, etc.) to see if it has any guaranteed unique attributes. If a node has guaranteed unique attributes that are a subset of the join attributes, the node is determined to be guaranteed unique for the join.

There several different types of joins that preserve uniqueness, varying by which side(s) of the join need be unique. For inner joins, both sides of the join need to be guaranteed unique for the join. If this is the case, then the guaranteed unique attributes that guarantee uniqueness for the join will still be unique. For example, assume the following:

create table A (id identity, name varchar(20));
create table B (id identity, name varchar(20));

For the above, a query such as "select A.id from A inner join B on A.id=B.id" will guarantee uniqueness on the attributes A.id and B.id, though A.id is the only relevant attribute since it is the only one in the select list.

For semi-join operations and/or anti-join operations, only the outer or preserving side of the join need be unique for the results of the join to be unique. For example, the results of query "select A.id from A where A.id in (select B.foo from B)" may only be pulled from A.id, so regardless of whether or not B is unique, the results will be, unique if A.id is unique. Once the various forms of uniqueness are annotated in the Join Graph, the optimizations may be applied.

For the outer join optimization, each node is checked to see if the non-preserving side of any join is guaranteed to be unique on a subset of the join attributes. If this is the case, then it is determined whether the attributes from the non-preserving side of the join are referenced elsewhere in the query. It is then determined whether the non-preserving node is external (e.g., has only one edge) in the Join Graph. This check is performed because if it has multiple edges, then it is implicitly referenced by the fact that it is present in other joins.

If all conditions are met, then the non-preserved node and the edge are removed. The same query level is continuously checked until all applicable external nodes and/or edges are removed. It may be possible that an initially internal node can be later pruned if all external nodes are pruned until this node, itself, becomes external. Once the current query level is checked, the algorithm recurses down into any sub-queries and applies the optimizations there. This means that even if entire sub-queries cannot be pruned off, parts of those sub-queries may still be able to be removed.

Referring now to the figures, FIG. 1 is a block diagram of an example computing device 100 for optimizing a query based on unique attributes. Computing device 100 may receive a query, optimize the query based on unique attributes associated with the query, and process the optimized query to obtain results to the query more efficiently.

Computing device 100 may be, for example, a web-based server, a local area network server, a cloud-based server, a notebook computer, a desktop computer, an all-in-one system, a tablet computing device, a mobile phone, an electronic book reader, a printing device, or any other electronic device suitable for optimizing a query based on unique attributes. Computing device 100 may include a processor 102 and a machine-readable storage medium 104. Computing device 100 may receive a query, optimize the query, and provide results to the query based on the optimization.

Processor 102 is a tangible hardware component that may be a central processing unit (CPU), a semiconductor-based microprocessor, and/or other hardware devices suitable for retrieval and execution of instructions stored in machine-readable storage medium 104. Processor 102 may fetch, decode, and execute instructions 106, 108, 110, 112, and 114 to control a process of optimizing a query based on unique attributes. As an alternative or in addition to retrieving and executing instructions, processor 102 may include at least one electronic circuit that includes electronic components for performing the functionality of instructions 106, 108, 110, 112, 114, or a combination thereof.

Machine-readable storage medium 104 may be any electronic, magnetic, optical, or other physical storage device that contains or stores executable instructions. Thus, machine-readable storage medium 104 may be, for example, Random Access Memory (RAM), an EPROM, an Electrically Erasable Programmable Read-Only Memory (EEPROM), a storage device, an optical disc, and the like. In some examples, machine-readable storage medium 104 may be a non-transitory storage medium, where the term "non-transitory" does not encompass transitory propagating signals. As described in detail below, machine-readable storage medium 104 may be encoded with a series of processor executable instructions 106, 108, 110, 112, and 114 for receiving a query; identifying at least one unique attribute based on at least one operation specified in the query or based on an attribute property associated with at least one relational table relevant to the query, the attribute property indicating uniqueness, accessing and modifying a data structure representing the query, the data structure having nodes each associated with a respective relational table, the data structure modified to specify a subset of the nodes that are associated with the at least one unique attribute; determining an optimization of the query based on the data structure modified to specify the subset; and processing the optimization.

Query receipt instructions 106 may manage and control the receipt queries. A query may specify a particular set of data that is being requested. The query may be received in any suitable manner. For example, a user may input a query using an application associated, with data stored in a database.

Unique attribute identification instructions 108 may manage and control the identification of unique attributes based on operations specified in the received query or based on attribute properties associated with any relational tables that may be relevant to the received query. For example, unique, attribute identification instructions 108 may identify at least one unique attribute based on an operation of a query, or unique attribute identification instructions 108 may identify at least one unique attribute of at least one relational table relevant to the query. The at least one unique attributed may be identified based on an attribute property associated with the at least one unique attribute, where the attribute property may indicate uniqueness. For example, certain attribute properties may indicate that the particular attribute associated with that attribute property, is unique, such as primary key constraints, unique constraints, identity column definitions, and the like. The unique attributes identified may be a single unique attribute or a set of attributes that are collectively unique.

Annotation instructions 110 may manage and control the accessing and modification of a data, structure representing the received query. A data structure may represent a query using nodes that may each be associated with a respective relational table relevant to the query. Annotation instructions 110 may access the data structure and may modify or annotate the data structure to specify a subset of the nodes that are associated with the at least one unique attribute identified for the query.

Query optimization instructions 112 may manage and control the optimization of the received query based on the annotated or modified data structure that specifies the subset of nodes associated with unique attributes. For example, query optimization instructions 112 may determine an optimization of the query based on the data structure modified to specify the subset of nodes and may apply the optimization to the query to generate an optimized query.

Query processing instructions 114 may manage and control the processing of the received query, including the processing of any optimized queries. For example, once the query is optimized, the optimization may be processed to produce results to the received query.

Figure 2:
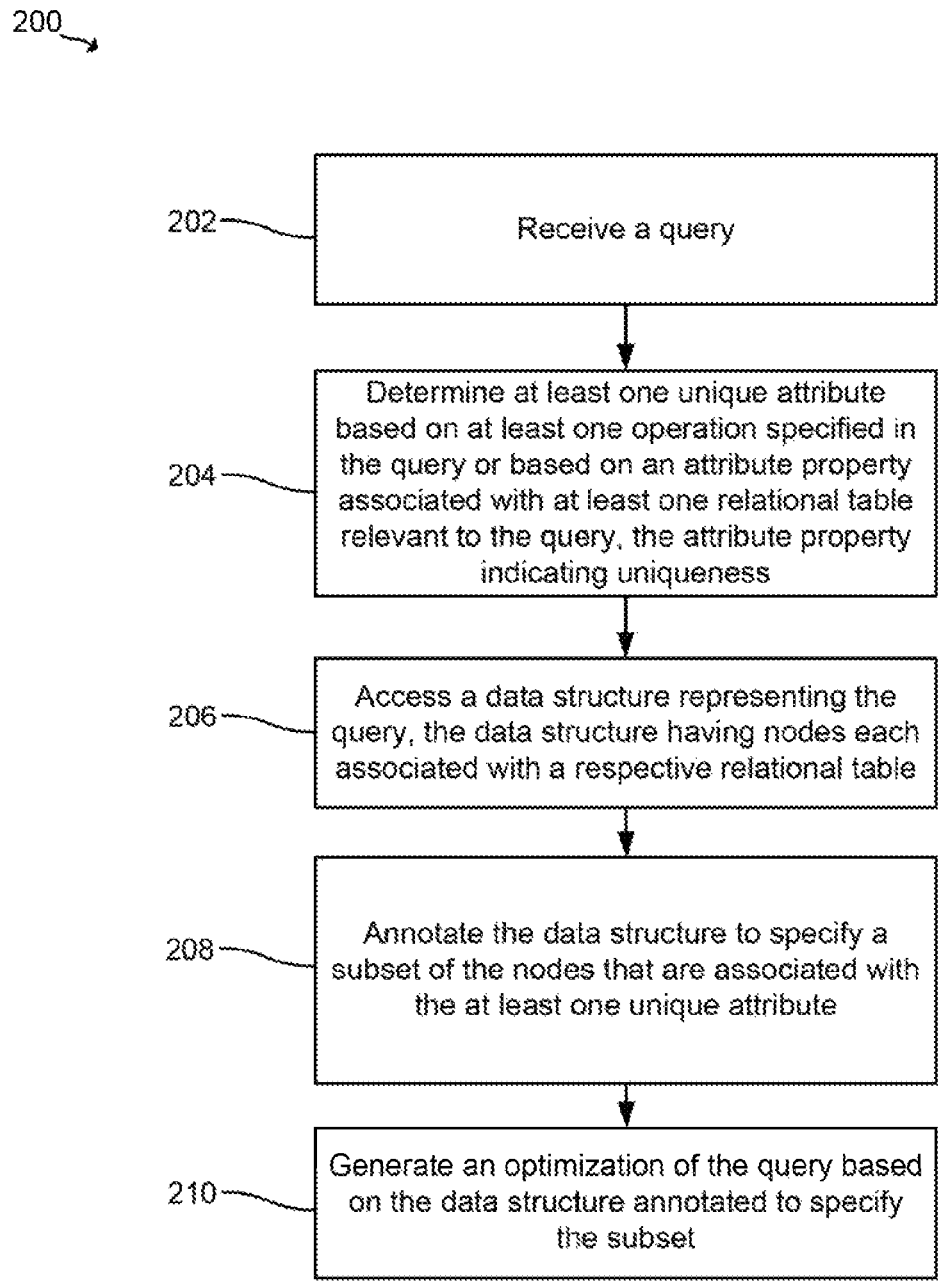
FIG. 2 is a flowchart of an example method for optimizing a query based on unique attributes.

FIG. 2 is a flowchart of an example method 200 for optimizing a query based on unique attributes. Method 200 may be implemented using computing device 100 of FIG. 1.

Method 200 includes, at 202, receiving a query. As described above, the query may be received in any suitable manner. For example, the query may be received from a user via an application.

Method 200 also includes, at 204, determining at least one unique attribute based on at least one operation specified in the query or based on an attribute property associated with at least one relational table relevant to the query, where the attribute property may indicate uniqueness.

Method 200 also includes, at 206, accessing a data structure representing the query. The data structure may have nodes that are each associated with a respective relational table that may be relevant to the query.

Method 200 also includes, at 208, annotating the data structure to specify a subset of the nodes that are associated with the at least one unique attribute identified for the query.

Method 200 also includes, at 210, generating an optimization of the query based on the data structure annotated to specify the subset of the nodes. The optimization may be an optimized query that may be processed to produce results to the received query.

Examples provided herein (e.g., methods) may be implemented in hardware, software, or a combination of both. Example systems may include a controller/processor and memory resources for executing instructions stored in a tangible non-transitory medium (e.g., volatile memory, non-volatile memory, and/or machine-readable media). Non-transitory machine-readable media can be tangible and have machine-readable instructions stored thereon that are executable by a processor to implement examples according to the present disclosure.

An example system can include and/or receive a tangible non-transitory machine-readable medium storing a set of machine-readable instructions (e.g., software). As used herein, the controller/processor can include one or a plurality of processors such as in a parallel processing system. The memory can include memory addressable by the processor for execution of machine-readable instructions. The machine-readable medium can include volatile and/or non-volatile memory such as a random access memory ("RAM"), magnetic memory such as a hard disk, floppy disk, and/or tape memory, a solid state drive ("SSD"), flash memory, phase change memory, and the like.

What is claimed is:

1. A computing device, comprising:
   a processor to:
      receive a query;
      identify at least one unique attribute based on at least one operation specified in the query or based on an attribute property associated with at least one relational table relevant to the query, the at least one unique attribute property indicating uniqueness;

annotate a data structure representing the query, the data structure having nodes each being associated with a respective relational table, the data structure modified to specify a subset of the nodes that are associated with the at least one unique attribute, wherein a portion of the nodes of the data structure are each associated with a sub-query and wherein annotating the data structure includes the processor modifying a sub-query data structure associated with each node of the portion of the nodes, each sub-query data structure being modified based on the at least one unique attribute; and optimize the query based on the data structure modified to specify the subset.

2. The computing device of claim 1, wherein the processor is further to process the query, based on the subset of the nodes specified in the modified data structure as associated with the at least one unique attribute, to obtain results of the query.

3. The computing device of claim 1, wherein the query is optimized by optimizing the at least one operation specified in the query, the at least one operation specified in the query being associated with the at least one unique attribute.

4. The computing device of claim 3, wherein the at least one operation specified in the query includes at least one of an order by clause, a group by clause, and a join clause.

5. The computing device of claim 1, wherein the data structure represents a join graph for the query, wherein the join graph comprises edges that each connect two nodes, wherein each edge represents a distinct join in the join graph.

6. The computing device of claim 1, wherein annotating the data structure comprises annotating each node with a set of attributes that are guaranteed to have unique values for that node.

7. A method, comprising:
receiving, by a computing device, a query;
determining, by the computing device, at least one unique attribute based on at least one operation specified in the query or based on an attribute property associated with at least one relational table relevant to the query, the attribute property indicating uniqueness;
accessing, by the computing device, a data structure representing the query, the data structure having nodes each associated with a respective relational table;
annotating, by the computing device, the data structure to specify a subset of the nodes that are associated with the at least one unique attribute, wherein a portion of the nodes of the data structure are each associated with a sub-query and wherein annotating the data structure includes annotating a sub-query data structure associated with each node of the portion of the nodes, each sub-query data structure being annotated based on the at least one unique attribute; and
generating, by the computing device, an optimization of the query based on the data structure annotated to specify the subset.

8. The method of claim 7, further comprising:
processing, by the computing device, the optimization of the query; and
providing, by the computing device, results of the processing as a response to the query.

9. The method of claim 7, wherein generating the optimization includes optimizing the at least one operation specified in the query, the at least one operation specified in the query being associated with the at least one unique attribute.

10. The method of claim 9, wherein the at least one operation specified in the query includes at least one of an order by clause, a group by clause, and a join clause.

11. The method of claim 7, wherein the data structure represents a join graph for the query, wherein the join graph comprises edges that each connect two nodes, wherein each edge represents a distinct join in the join graph.

12. The method of claim 7, wherein annotating the data structure comprises annotating each node with a set of attributes that are guaranteed to have unique values for that node.

13. A non-transitory machine-readable storage medium storing instructions that, if executed by at least one processor of a computing device, cause the computing device to:
receive a query;
identify at least one unique attribute based on at least one operation specified in the query or based on an attribute property associated with at least one relational table relevant to the query, the at least one unique attribute property indicating uniqueness;
access a data structure representing the query, the data structure having nodes each being associated with a respective relational table;
annotate the data structure to specify a subset of the nodes that are associated with the at least one unique attribute, wherein a portion of the nodes of the data structure are each associated with a sub-query and wherein modifying the data structure includes modifying a sub-query data structure associated with each node of the portion of the nodes, each sub-query data structure being modified based on the at least one unique attribute;
determine an optimization of the query based on the data structure modified to specify the subset; and
process the optimization of the query.

14. The non-transitory machine-readable storage medium of claim 13, wherein the instructions further cause the computing device to return results of the optimization as a response to the query.

15. The non-transitory machine-readable storage medium of claim 13, wherein the optimization is determined by optimizing the at least one operation specified in the query, the at least one operation specified in the query being associated with the at least one unique attribute.

16. The non-transitory machine-readable storage medium of claim 15, wherein the at least one operation specified in the query includes at least one of an order by clause, a group by clause, and a join clause.

17. The non-transitory machine-readable storage medium of claim 13, wherein the data structure represents a join graph for the query, wherein the join graph comprises edges that each connect two nodes, wherein each edge represents a distinct join in the join graph.

18. The non-transitory machine-readable storage medium of claim 13, wherein annotating the data structure comprises annotating each node with a set of attributes that are guaranteed to have unique values for that node.

* * * * *